US012686324B2

(12) United States Patent
Sunaga et al.

(10) Patent No.: US 12,686,324 B2
(45) Date of Patent: Jul. 21, 2026

(54) LEVELING ACTUATOR AND VEHICLE LAMP

(71) Applicant: STANLEY ELECTRIC CO., LTD., Tokyo (JP)

(72) Inventors: Hiroshi Sunaga, Tokyo (JP); Junpei Inmaru, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 19/184,944

(22) Filed: Apr. 21, 2025

(65) Prior Publication Data

US 2025/0326349 A1    Oct. 23, 2025

(30) Foreign Application Priority Data

Apr. 23, 2024    (JP) ................................. 2024-069434

(51) Int. Cl.
  *B60Q 1/10*        (2006.01)
  *B60Q 1/04*        (2006.01)
  *B60Q 1/068*       (2006.01)

(52) U.S. Cl.
  CPC ............... *B60Q 1/10* (2013.01); *B60Q 1/045* (2013.01); *B60Q 1/0683* (2013.01)

(58) Field of Classification Search
  CPC ................................. B60Q 1/10; B60Q 1/045
  See application file for complete search history.

(56) References Cited

U.S. PATENT DOCUMENTS

| | | | | |
|---|---|---|---|---|
| 5,993,033 A * | 11/1999 | Sugimoto | ............ | B60Q 1/0683 |
| | | | | 362/324 |
| 6,220,735 B1 * | 4/2001 | Matubara | ............. | B60Q 1/0683 |
| | | | | 362/531 |
| 2008/0106909 A1 * | 5/2008 | Kusagaya | ............ | B60Q 1/0683 |
| | | | | 362/523 |
| 2008/0112181 A1 * | 5/2008 | Tatara | ..................... | B60Q 1/10 |
| | | | | 362/523 |
| 2008/0130301 A1 * | 6/2008 | Kusagaya | ............. | B60Q 1/076 |
| | | | | 362/466 |
| 2015/0117043 A1 * | 4/2015 | Shibata | ................. | F21S 41/151 |
| | | | | 362/512 |
| 2017/0349086 A1 * | 12/2017 | Toulisse | ................. | B60Q 1/076 |
| 2017/0370548 A1 * | 12/2017 | Dinant | ................. | B60Q 1/0683 |
| 2019/0092220 A1 * | 3/2019 | Aizawa | ................ | B60Q 1/0064 |
| 2019/0299845 A1 * | 10/2019 | Imamura | ............... | B60Q 1/076 |
| 2020/0164789 A1 * | 5/2020 | Tajima | ................. | B60Q 1/0683 |

FOREIGN PATENT DOCUMENTS

JP        2007-055600 A        3/2007

* cited by examiner

*Primary Examiner* — Bryon T Gyllstrom
(74) *Attorney, Agent, or Firm* — Kenealy Vaidya LLP

(57)        ABSTRACT

A leveling actuator includes a leveling shaft slidably driven in an axial direction in a state in which a tip side is connected to a lighting fixture unit via a pivot portion, a case configured to accommodate the leveling shaft therein from an opening portion on a back side and configured to cause the tip side of the leveling shaft to protrude forward from a hole portion on a front side, a cover configured to close the opening portion of the case and having a hole portion on a back side, and an aiming nut provided to face the hole portion on the back side of the cover, an aiming bolt inserted into the cover from the hole portion being located on the same axis as the leveling shaft while being screwed into the aiming nut.

6 Claims, 14 Drawing Sheets

41       41       40       40a

LEVELING ACTUATOR AND VEHICLE LAMP

CROSS-REFERENCE TO RELATED APPLICATION

Priority is claimed on Japanese Patent Application No. 2024-069434, filed Apr. 23, 2024, the content of which is incorporated herein by reference.

BACKGROUND OF THE INVENTION

Field of the Invention

The present invention relates to a leveling actuator and a vehicle lamp.

Description of Related Art

In the related art, in vehicle lamps such as vehicle headlights (head lamps), a lighting fixture unit that radiates light in front of the vehicle is placed inside a lighting body that is constituted by a housing with an opening in a front surface and an outer lens that covers the opening of the housing, and an optical axis adjustment mechanism that adjusts an optical axis of the light radiated from the lighting fixture unit in front of the vehicle is known (for example, see Japanese Unexamined Patent Application, First Publication No. 2007-55600).

In the vehicle lamp including such an optical axis adjustment mechanism, an optical axis of the light radiated from the lighting fixture unit in front of the vehicle is adjusted by an aiming operation that adjusts a tilt in a leftward/rightward direction and a tilt in an upward/downward direction of the lighting fixture unit.

In addition, after detecting the tilt of the vehicle in the forward/rearward direction, a leveling operation is performed to automatically adjust the optical axis of the light radiated from the lighting fixture unit in front of the vehicle in the upward/downward direction, thereby correcting for fluctuations in the optical axis caused by changes in the vehicle's attitude.

For example, Japanese Unexamined Patent Application, First Publication No. 2007-55600 discloses a reflector-movable head lamp for an automobile with an auto-leveling function, in which a reflector equipped with a light source is supported by an aiming mechanism constituted by an aiming point of a pair of left and right ball joint structures and a fulcrum directly below, and in which an aiming fulcrum is moved back and forth by driving an actuator, wherein the aiming point being constituted by a slider-attached nut member that threads into a screw and a bearing that is attached to a bracket on the reflector side and supports a ball part of a nut member, a bearing being made up of a pair of split molded bodies connected by a hinge, and a ball joint being formed by integrating the split molded bodies around the hinge so as to sandwich the ball part.

SUMMARY OF THE INVENTION

Incidentally, in the invention disclosed in Japanese Unexamined Patent Application, First Publication No. 2007-55600, the aiming mechanism is attached to a lamp body to be slidable in the forward/rearward direction via a bracket accommodated inside the lamp body.

However, in the case of this configuration, a bracket is interposed between the lamp body and the aiming mechanism. Accordingly, not only does this enlarge a space required to accommodate the bracket, it also leads to an increase in the number of parts and assembly man-hours.

In addition, in the invention disclosed in Japanese Unexamined Patent Application, First Publication No. 2007-55600, a slider, which is integral with the above-mentioned slider-attached nut member, is supported on a nut sliding guide provided on the lamp body, and the slider-attached nut member is supported so as to be slidable in the forward/rearward direction. In addition, in order to eliminate a gap formed between the nut sliding guide and the slider, an elastic extension piece provided on the slider is pressed against an inner wall surface of the nut sliding guide.

However, in the case of this configuration, it is necessary to provide the slider with a spring structure such as an elastic extension piece, which complicates a mold structure when molding the slider-attached nut member from resin.

An aspect of the present invention is directed to providing a leveling actuator that has a simple structure and enables space saving within a lighting body, and a vehicle lamp equipped with such a leveling actuator.

An aspect of the present invention provides the following configurations.

(1) A leveling actuator configured to adjust an optical axis of light radiated from a lighting fixture unit of a vehicle lamp, in which the lighting fixture unit is disposed inside a lighting body, in front of a vehicle, the leveling actuator including:

a leveling shaft slidably driven in an axial direction in a state in which a tip side is connected to the lighting fixture unit via a pivot portion;

a case configured to accommodate the leveling shaft therein from an opening portion on a back side and configured to cause the tip side of the leveling shaft to protrude forward from a hole portion on a front side;

a cover configured to close the opening portion of the case and having a hole portion on a back side; and an aiming nut provided to face the hole portion on the back side of the cover, wherein an aiming bolt inserted into the cover from the hole portion is located on a same axis as the leveling shaft while being screwed into the aiming nut.

(2) The leveling actuator according to the above-mentioned (1), wherein a shaft hole into which a tip side of the aiming bolt is inserted in a non-contact state is provided on a rear end side of the leveling shaft.

(3) The leveling actuator according to the above-mentioned (1), wherein the aiming bolt is rotatably attached to a housing that constitutes the back side of the lighting body, and a case body constituted by the case and the cover is slid in a forward/rearward direction by a rotate operation of the aiming bolt.

(4) The leveling actuator according to the above-mentioned (3), wherein the housing has an accommodating recess portion configured to accommodate the case body to be slidable in the forward/rearward direction, and a plurality of guide protrude portions are provided around the case body to be in sliding contact with an inner surface of the accommodating recess portion.

(5) The leveling actuator according to the above-mentioned (1), further including a rotary motor and a drive transmission part accommodated inside the case, wherein rotation driving of the rotary motor is converted into slide driving of the leveling shaft and is transmitted via the drive transmission part.

(6) A vehicle lamp comprising the leveling actuator according to any one of the above-mentioned (1) to (5).

As described above, according to the aspect of the present invention, it is possible to provide a leveling actuator that has a simple structure and enables space saving within a lighting body, and a vehicle lamp equipped with such a leveling actuator.

DETAILED DESCRIPTION OF THE INVENTION

Figure 1:
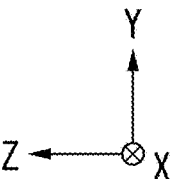
FIG. 1 is a rear view showing a configuration of a vehicle lamp including a leveling actuator according to an embodiment of the present invention.

Hereinafter, an embodiment of the present invention will be described in detail with reference to the accompanying drawings.

Further, in the drawings used in the following descriptions, dimensions of each component may be shown at different scales in order to make each component easier to see, and dimensional ratios of each component may not necessarily be the same as in reality.

As the embodiment of the present invention, for example, a vehicle lamp 1 shown in FIG. 1 to FIG. 14 will be described.

Figure 2:
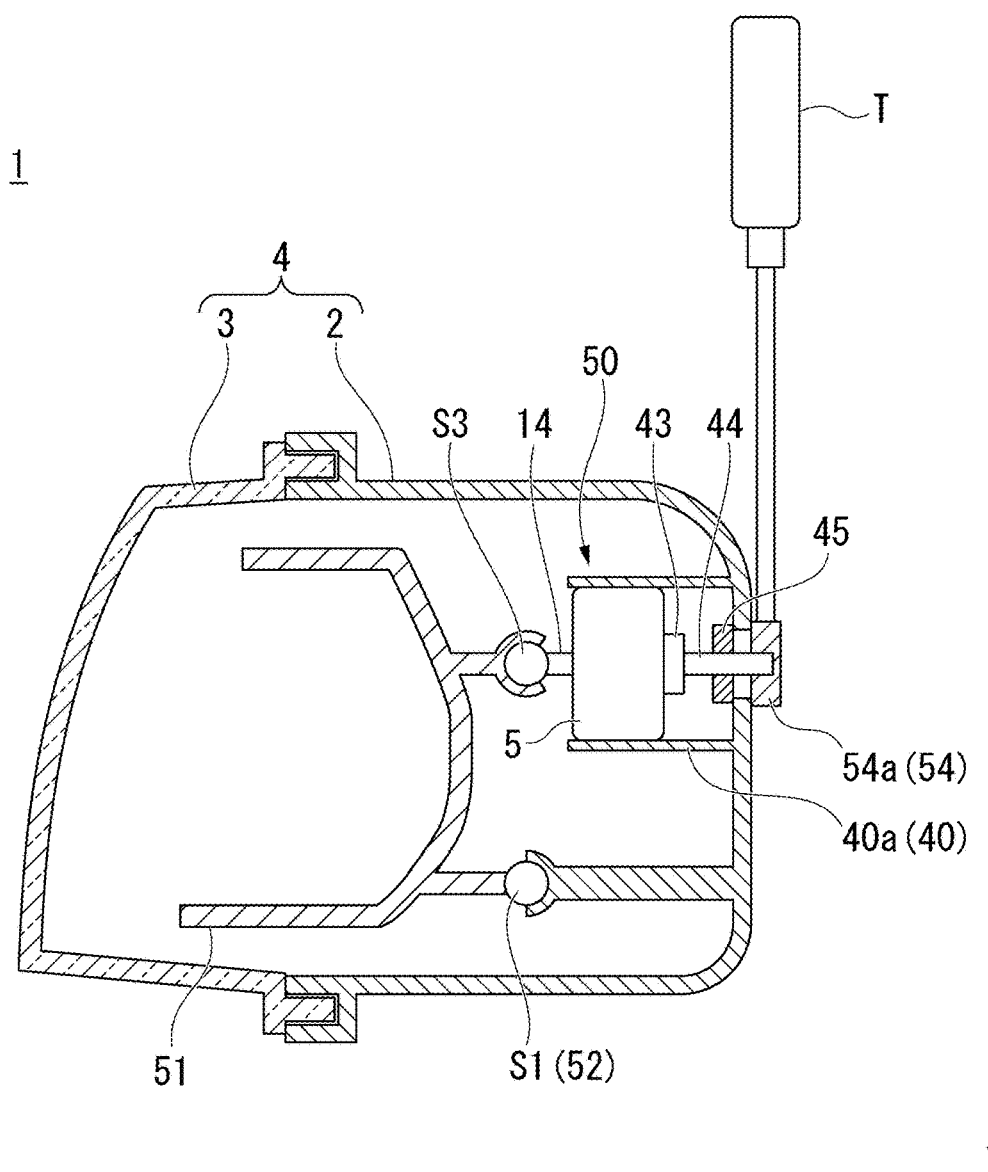
FIG. 2 is a cross-sectional view of the vehicle lamp along line segment A-A shown in FIG. 1.
Figure 3:
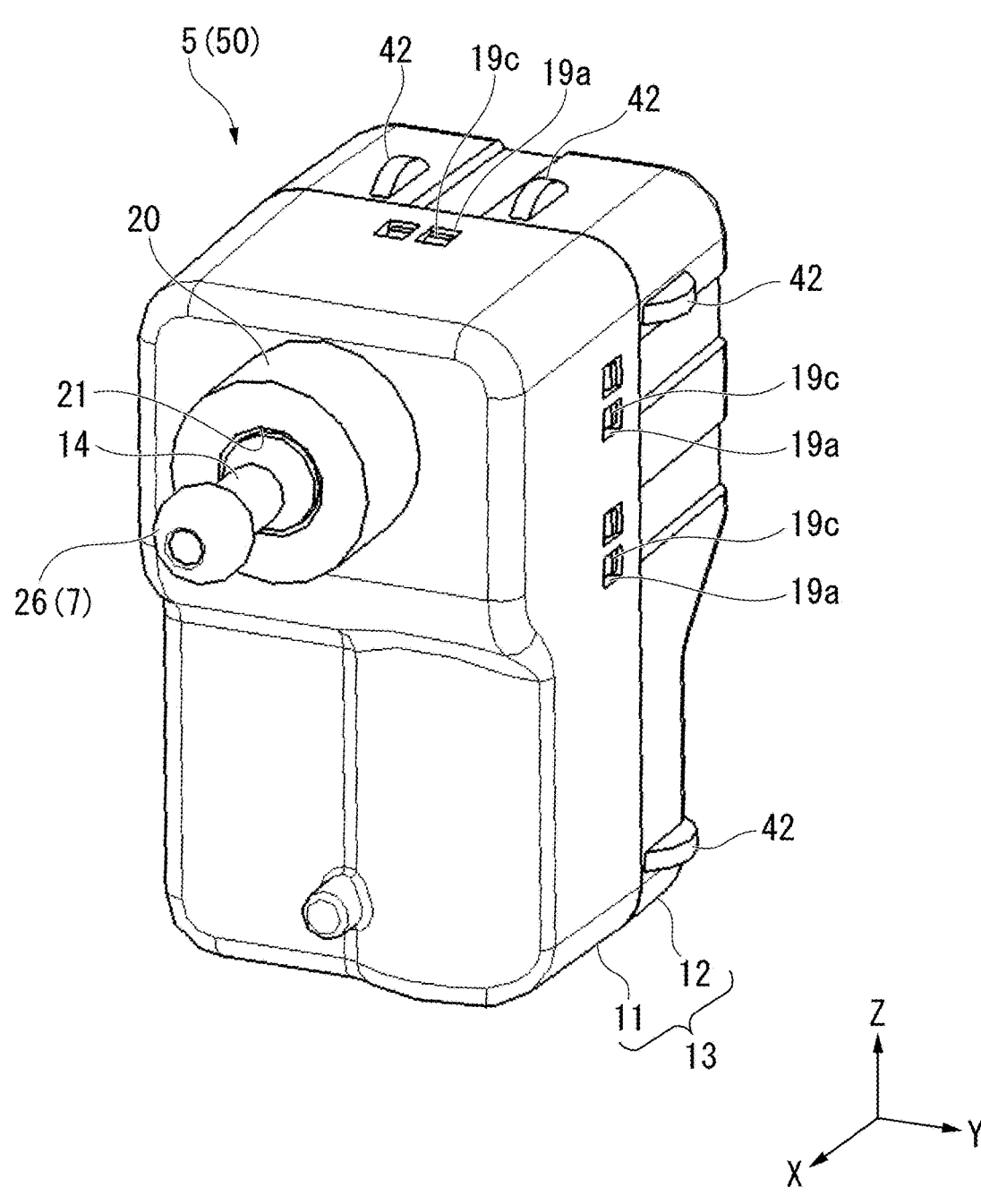
FIG. 3 is a perspective view of the leveling actuator shown in FIG. 1 when seen from a front side.

Further, FIG. 1 is a front view showing a configuration of the vehicle lamp 1 including a leveling actuator 5. FIG. 2 is a cross-sectional view of the vehicle lamp 1 along line segment A-A shown in FIG. 1. FIG. 3 is a perspective view

Figure 4:
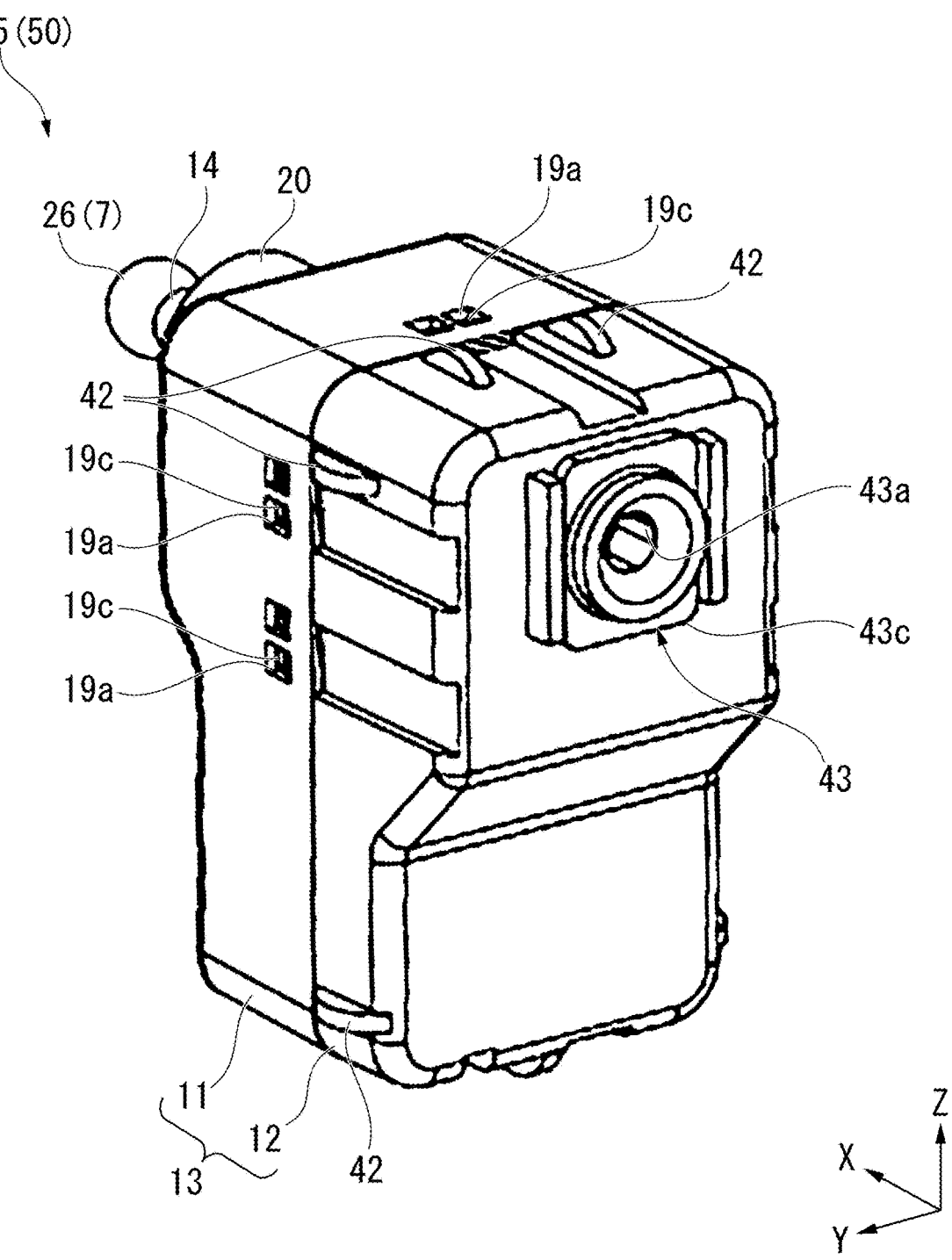
FIG. 4 is a perspective view of the leveling actuator shown in FIG. 1 when seen from a back side.
Figure 5:
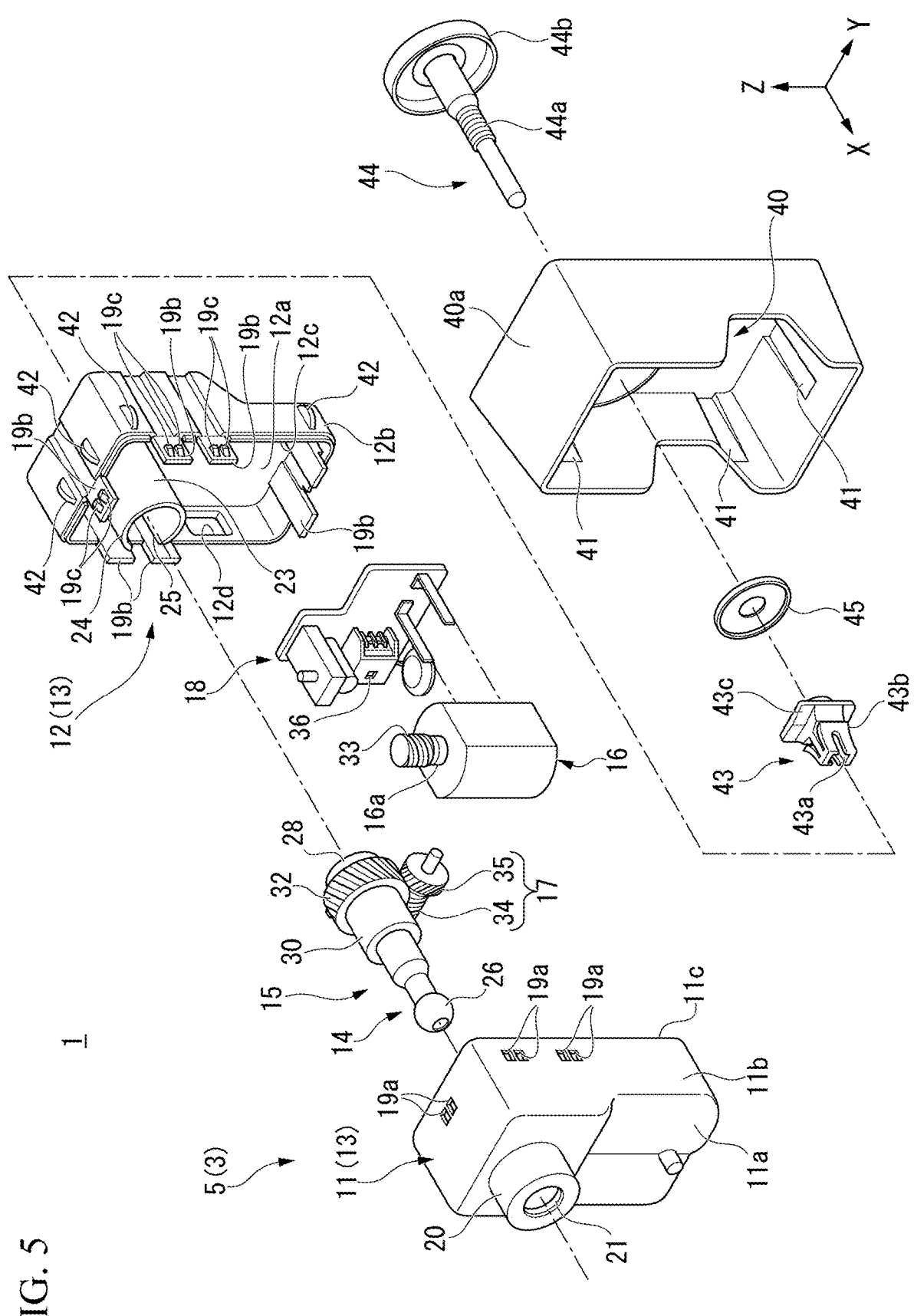
FIG. 5 is an exploded perspective view of the leveling actuator shown in FIG. 1 when seen from the front side.
Figure 6:
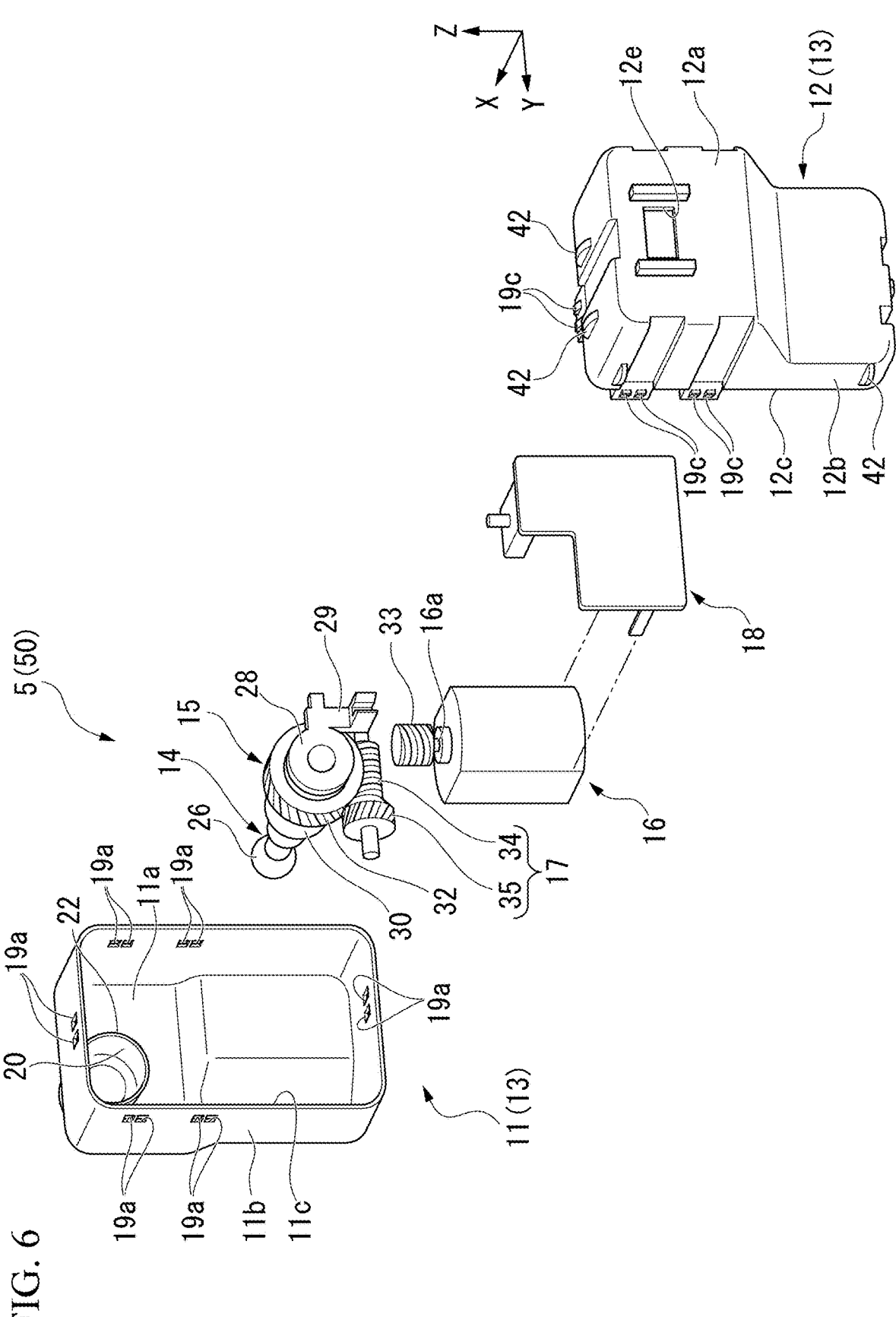
FIG. 6 is an exploded perspective view of the leveling actuator shown in FIG. 1 when seen from the back side.
Figure 7:
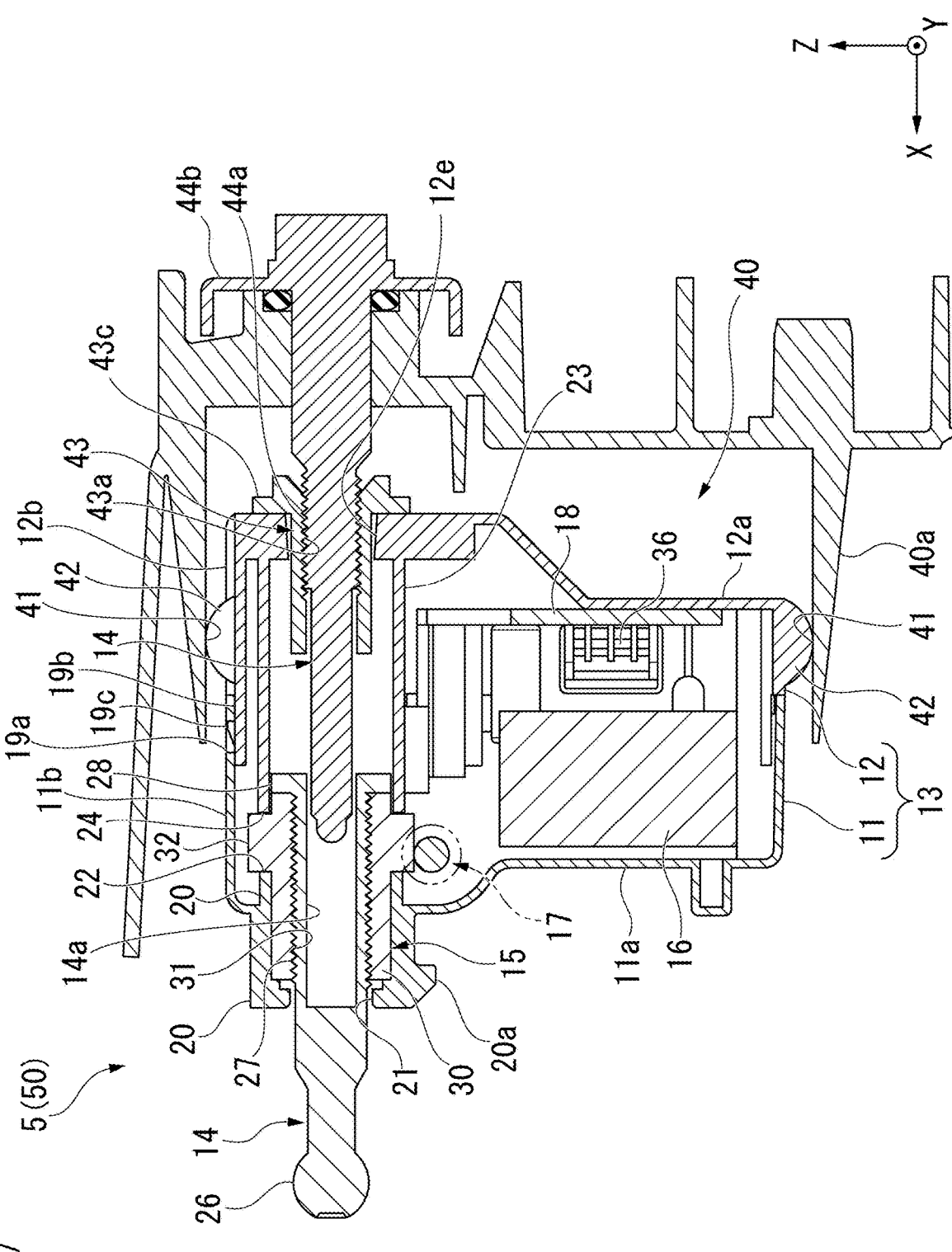
FIG. 7 is a cross-sectional view showing a structure of the leveling actuator shown in FIG. 1.
Figure 8:
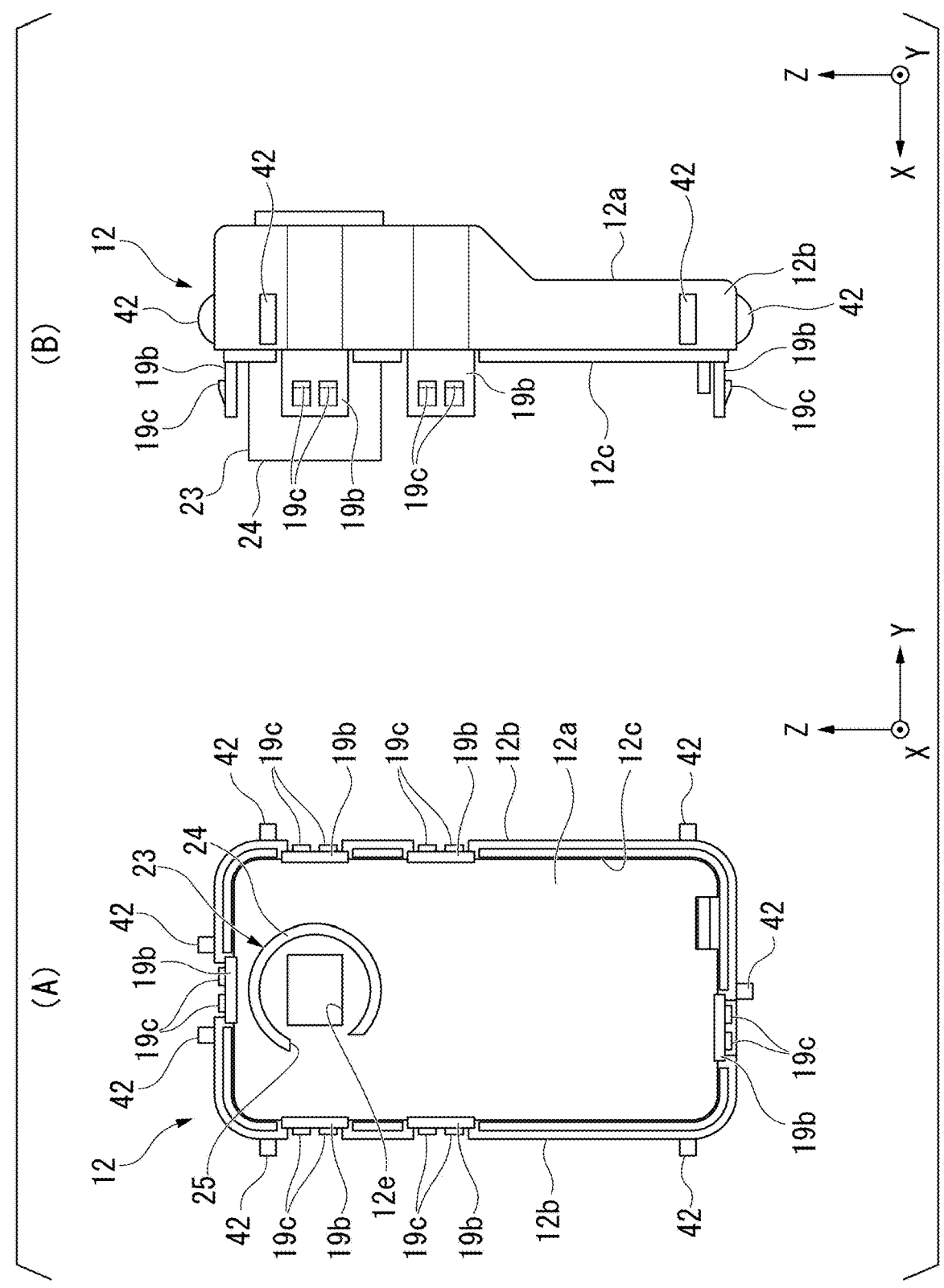
FIG. 8 shows a cover included in the leveling actuator, a portion (A) is a front view thereof, and a portion (B) is a side view thereof.
Figure 9:
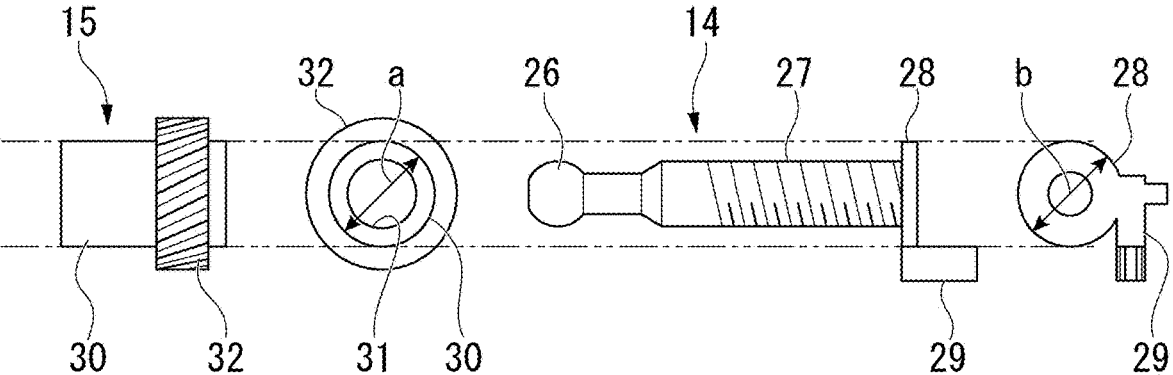
FIG. 9 is a view showing a dimension of a wheel portion of a shaft and a rotating cylinder of a rotation support body provided in the leveling actuator shown in FIG. 1.
Figure 10:
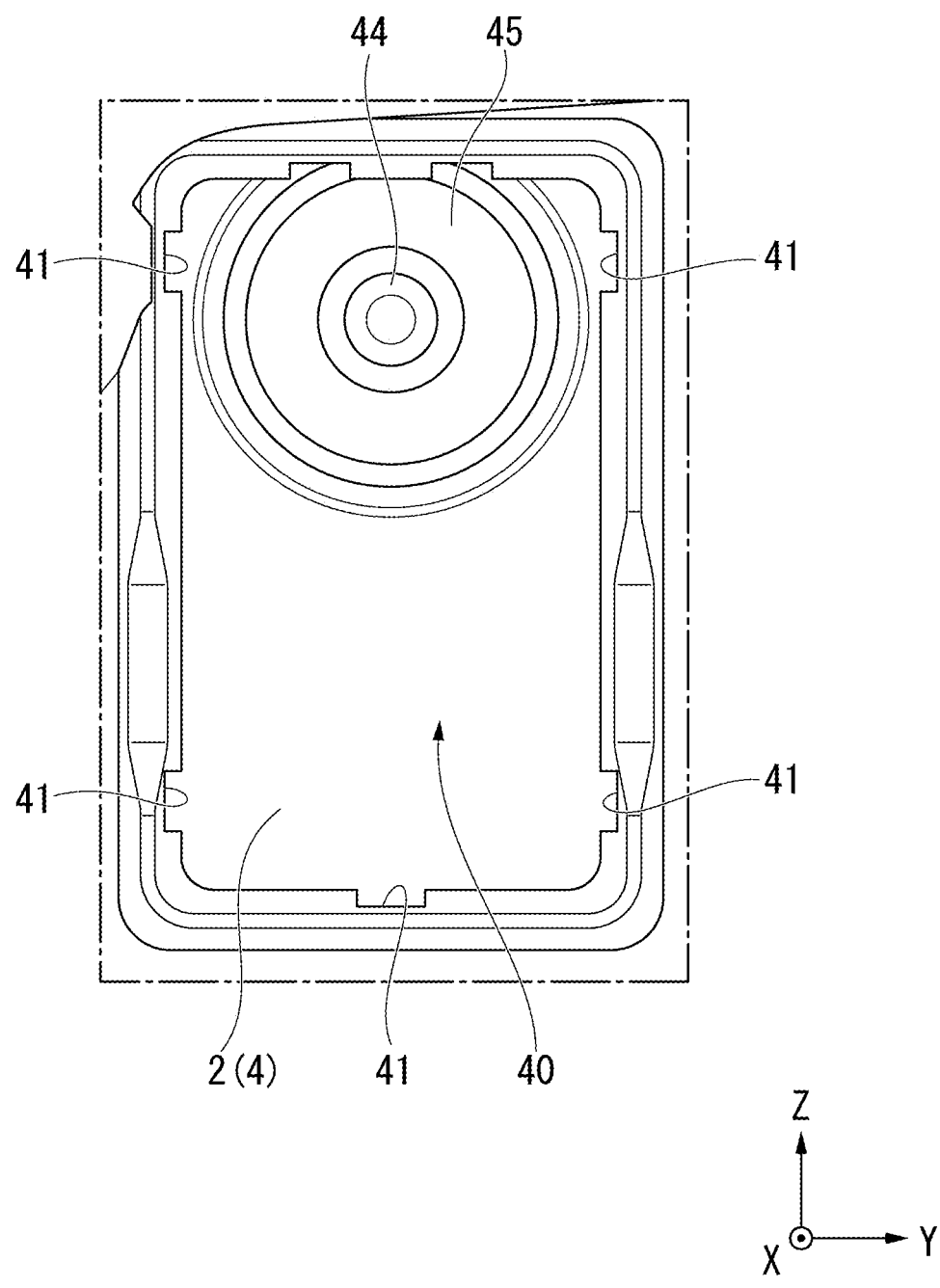
FIG. 10 is a front view showing an accommodating recess portion provided inside a housing.
Figure 11:
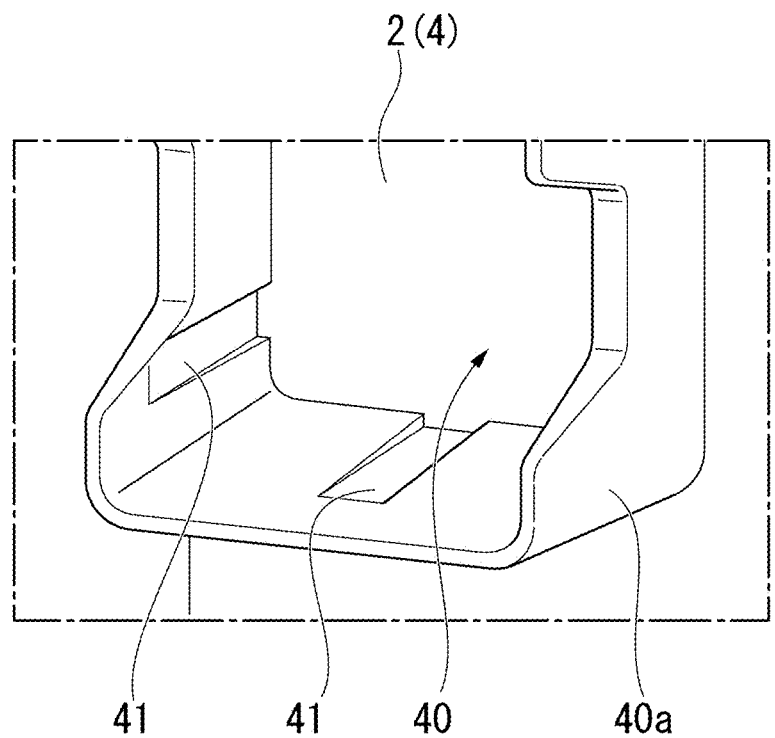
FIG. 11 is an enlarged perspective view of a major part of an accommodating recess portion shown in FIG. 10.
Figure 11:
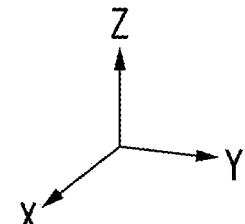
Figure 12:
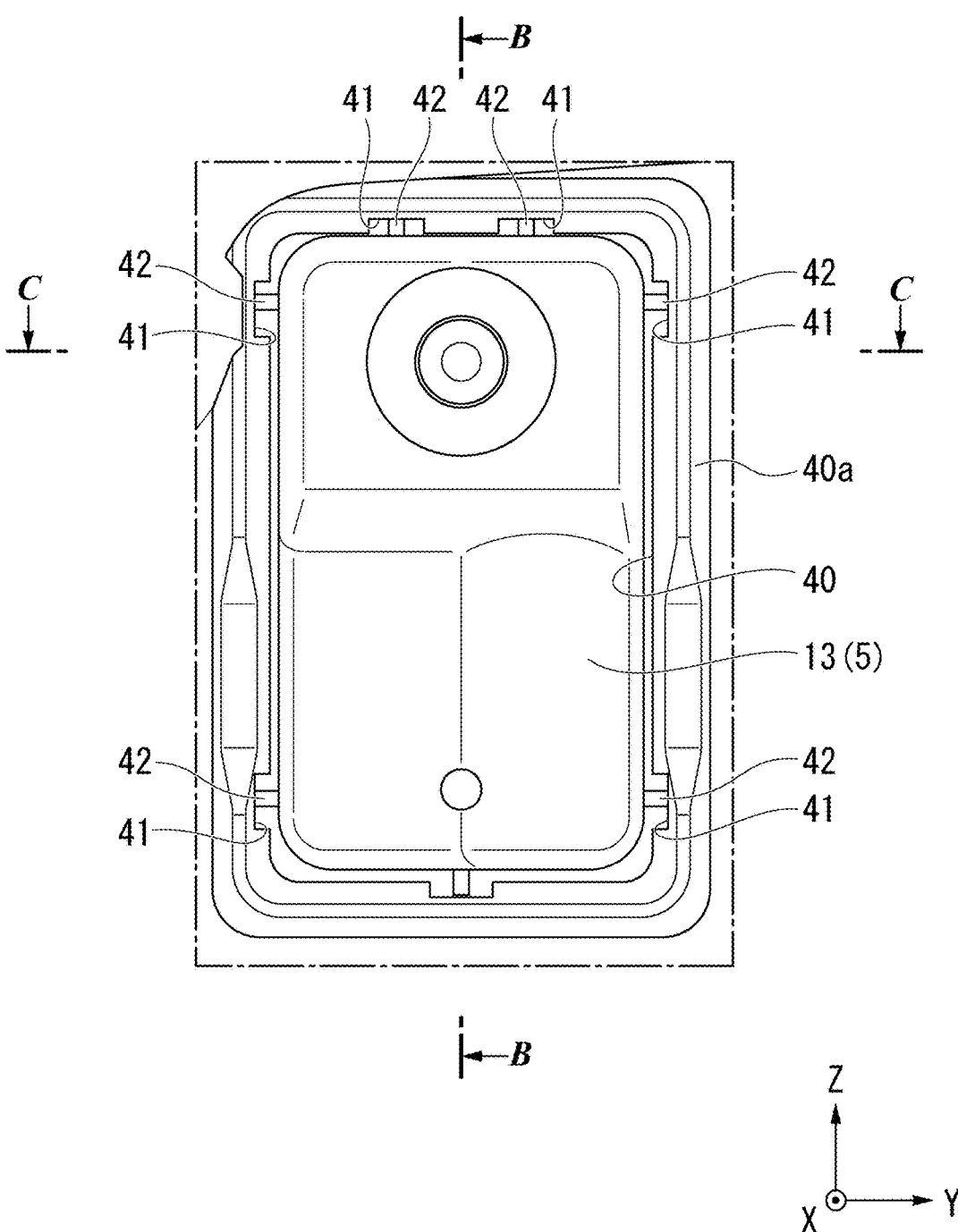
FIG. 12 is a front view showing a state in which a case body of the leveling actuator is accommodated in the accommodating recess portion of the housing.
Figure 13:
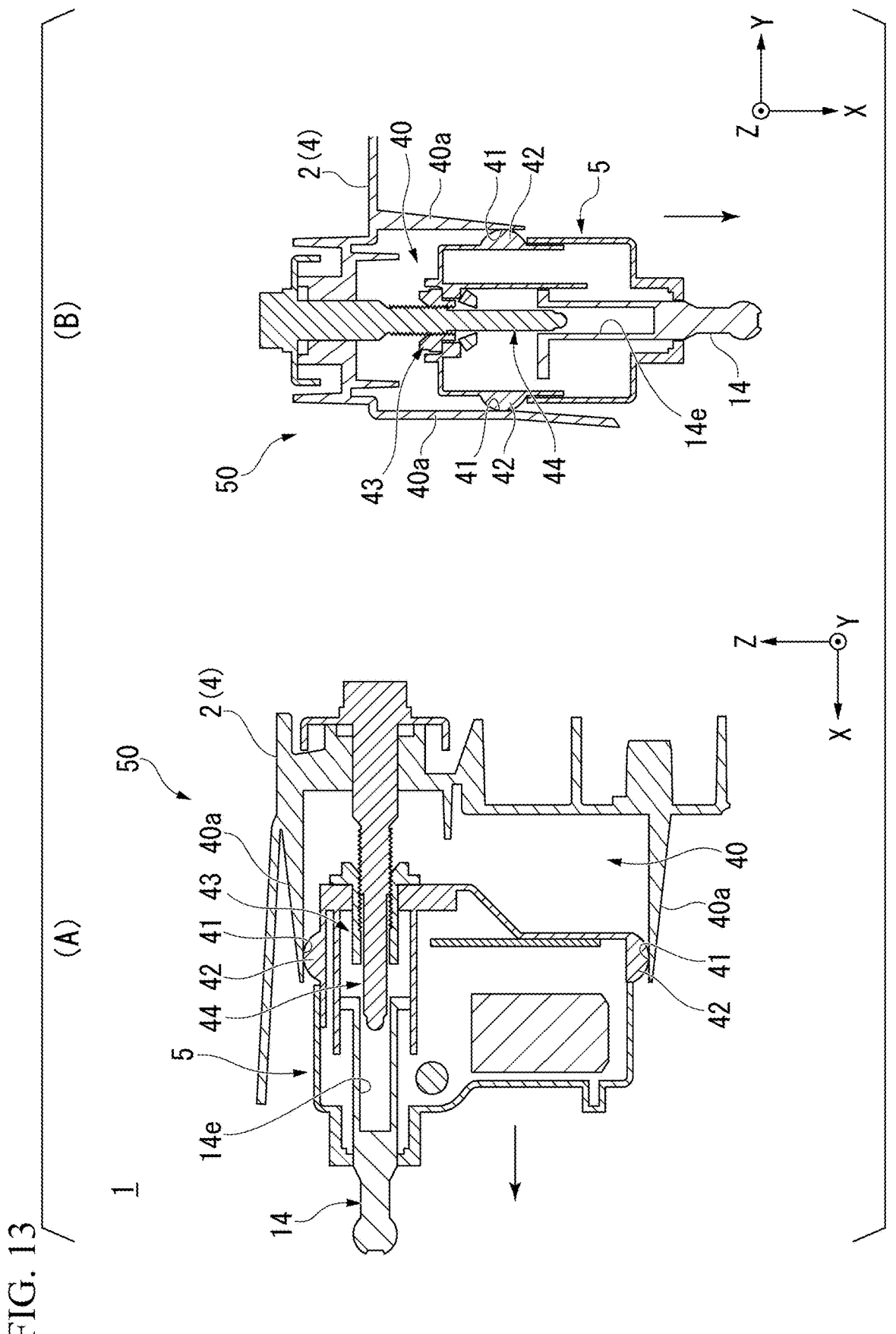
FIG. 13 shows a state in which the leveling actuator is slid forward, a portion (A) is a cross-sectional view along line segment B-B shown in FIG. 12, and a portion (B) is a cross-sectional view along line segment C-C shown in FIG. 12.
Figure 14:
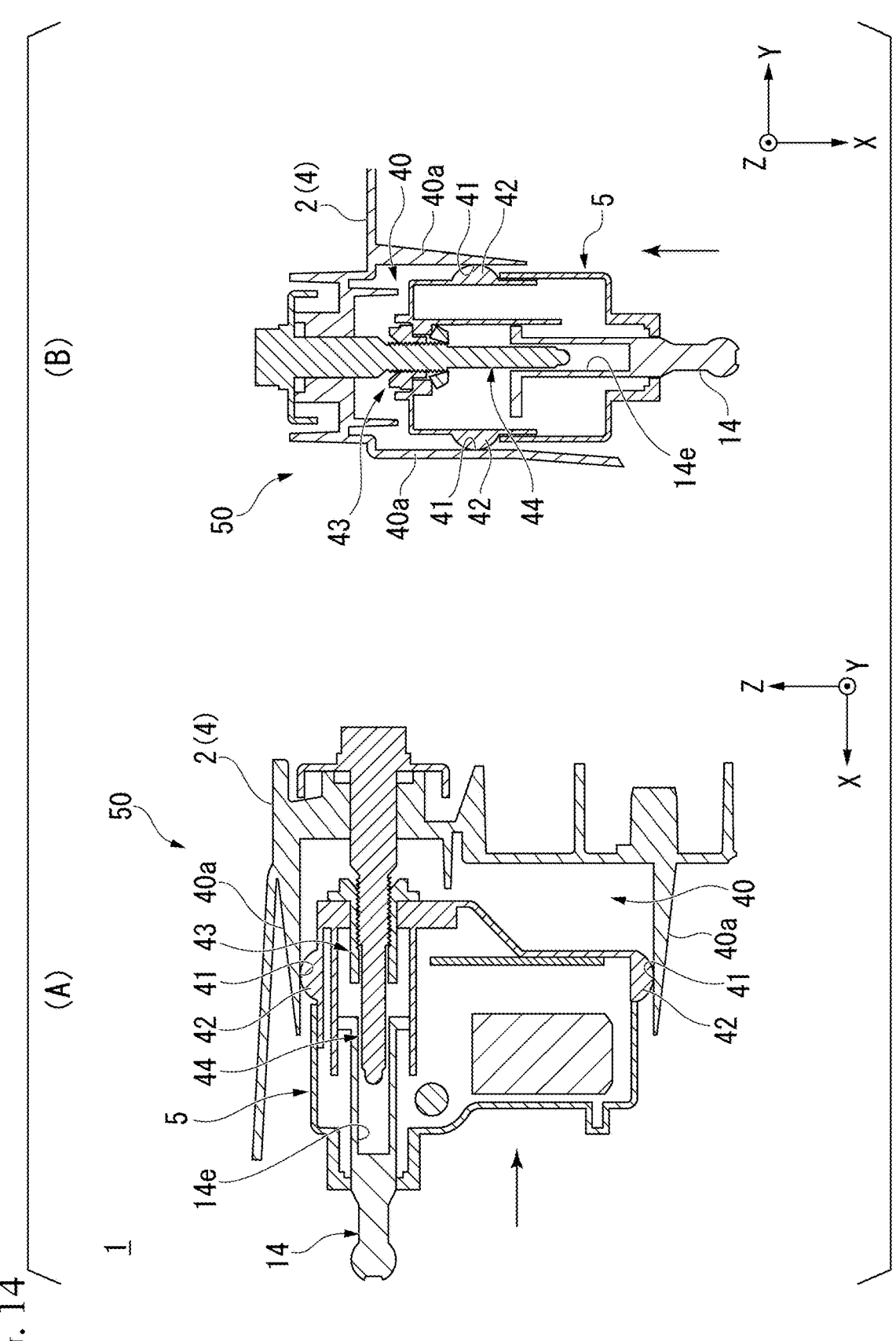
FIG. 14 shows a state in which the leveling actuator is slid rearward, a portion (A) is a cross-sectional view along line segment B-B shown in FIG. 12, and a portion (B) is a cross-sectional view along line segment C-C shown in FIG. 12.

4 of the leveling actuator 5 when seen from a front side. FIG. 4 is a perspective view of the leveling actuator 5 when seen from a back side. FIG. 5 is an exploded perspective view of the leveling actuator 5 when seen from the front side. FIG. 6 is an exploded perspective view of the leveling actuator 5 when seen from the back side. FIG. 7 is a cross-sectional view showing a structure of the leveling actuator 5. FIG. 8 shows a cover 12 included in the leveling actuator 5, a portion (A) of FIG. 8 is a front view thereof, and a portion (B) of FIG. 8 is a side view thereof. FIG. 9 is a view showing a dimension of a wheel portion 28 of a leveling shaft 14 and a rotating cylinder 30 of a rotation support body 15 included in the leveling actuator 5. FIG. 10 is a front view showing an accommodating recess portion 40 provided inside a housing 2. FIG. 11 is an enlarged perspective view showing a major part of the accommodating recess portion 40. FIG. 12 is a front view showing a state in which a case body of the leveling actuator is accommodated in the accommodating recess portion of the housing. FIG. 13 shows a state in which the leveling actuator 5 is slid forward, a portion (A) of FIG. 13 is a cross-sectional view along line segment B-B shown in FIG. 12, and a portion (B) of FIG. 13 is a cross-sectional view along line segment C-C shown in FIG. 12. FIG. 14 shows a state in which the leveling actuator 5 is slid rearward, a portion (A) of FIG. 14 is a cross-sectional view along line segment B-B shown in FIG. 12, and a portion (B) of FIG. 14 is a cross-sectional view along line segment C-C shown in FIG. 12.

In addition, in the following drawings, an XYZ orthogonal coordinate system is set, an X-axis direction indicates a forward/rearward direction (lengthwise direction) of the vehicle lamp 1, a Y-axis direction indicates a leftward/rightward direction (widthwise direction) of the vehicle lamp 1, and a Z-axis direction indicates an upward/downward direction (height direction) of the vehicle lamp 1.

The vehicle lamp 1 of the embodiment is an application of the present invention to, for example, vehicle headlights (head lamps) mounted on both corner portions of a front end side of a vehicle (not shown in the drawings).

Specifically, as shown in FIG. 1 and FIG. 2, the vehicle lamp 1 has a structure in which a lighting fixture unit configured to radiate light toward the front of the vehicle (+X-axis direction) is disposed inside a lighting body 4 constituted by the housing 2 with an opening in a front surface and a transparent outer lens 3 configured to cover the opening of the housing 2.

Further, in FIG. 2, illustration of a lighting fixture unit disposed inside the lighting body 4 is omitted. In addition, a shape of the lighting body 4 is not particularly limited and can be changed as appropriate to match the design of the vehicle lamp 1.

The lighting fixture unit includes a light source constituted by a light emitting diode (LED) that emits, for example, white light (hereinafter simply referred to as light), and a reflector that reflects the light emitted from the light source, and is configured to radiate the light reflected by the reflector toward the front of the vehicle.

The lighting fixture unit radiates light as a passing beam (low beam) toward the front of the vehicle, forming a light distribution pattern for a low beam that includes a cut-off line in the upper beam. Alternatively, as a traveling beam (high beam), light that forms a light distribution pattern for a high beam above the light distribution pattern for a low beam is radiated toward the front of the vehicle.

Further, the lighting fixture unit is not necessarily limited to a configuration in which the light reflected by the reflector described above is radiated toward the front of the vehicle, and may also be configured, for example, to radiate the light emitted from the light source using a lens toward the front of the vehicle.

In addition, as for the light source, in addition to the above-mentioned LED, light emitting elements such as a laser diode (LD) can be used. Further, the number of light emitting elements is not limited to one, but may be multiple.

The vehicle lamp 1 of the embodiment includes an optical axis adjustment mechanism 50 configured to adjust an optical axis of the light radiated from the lighting fixture unit toward the front of the vehicle.

The optical axis adjustment mechanism 50 includes an aiming bracket 51 configured to hold the light source unit, and has a structure in which the aiming bracket 51 is supported to be tiltable with respect to the housing 2 via a fixed support part 52, a first aiming part 53 and a second aiming part 54.

Specifically, as shown in FIG. 1, the optical axis adjustment mechanism 50 has the fixed support part 52 that is located at a first support point S1 among three support points S1, S2 and S3 that support the aiming bracket 51 with respect to the housing 2 in order to fix a position of the aiming bracket 51 to the housing 2 and that is configured to support the aiming bracket 51 in a tiltable manner, the first aiming part 53 that is located at a second support point S2 and that is configured to adjust a tilt in a leftward/rightward direction of the aiming bracket 51 with respect to the housing 2, and the second aiming part 54 that is located at a third support point S3 and that is configured to adjust a tilt in an upward/downward direction of the aiming bracket 51 with respect to the housing 2.

In addition, when the light source unit is seen in a front view, the first support point S1 and the second support point S2 are located below an optical axis center O of the light source unit, and a line LH12 that connects the first support point S1 and the second support point S2 is parallel to a horizontal line LH passing through the optical axis center O. In addition, the third support point S3 is located above the optical axis center O of the light source unit, and a line LV13 that connects the second support point S2 and the third support point S3 is parallel to a vertical line LV passing through the optical axis center O. Further, the optical axis center O of the light source unit is located inside an area E surrounded by the first support point S1, the second support point S2 and the third support point S3. Further, the disposition of the three support points S1, S2 and S3 is not limited to this disposition and can be changed as appropriate.

In the vehicle lamp 1 including the optical axis adjustment mechanism 50 of the embodiment, the optical axis of the light radiated from the light source unit toward the front of the vehicle can be adjusted by an aiming operation of adjusting the tilt in the leftward/rightward direction and the tilt in the upward/downward direction of the aiming bracket 51 that holds the light source unit.

That is, in the optical axis adjustment mechanism 50 of the embodiment, for example, by using a jig T such as a driver to rotate an adjuster 53a of the first aiming part 53, the first aiming part 53 slides the second support point S2 of the aiming bracket 51 in the forward/rearward direction. Here, the fixed support part 52 (the first support point S1) is used as a fulcrum, and the aiming bracket 51 swings in the leftward/rightward direction. Accordingly, it is possible to adjust the tilt in the leftward/rightward direction of the aiming bracket 51 that holds the light source unit.

Meanwhile, in the optical axis adjustment mechanism 50 of the embodiment, by using the jig T described above to rotate an adjuster 54a of the second aiming part 54, the second aiming part 54 slides the third support point S3 of the aiming bracket 51 in the forward/rearward direction. Here, the fixed support part 52 (the first support point S1) is used as a fulcrum, and the aiming bracket 51 swings in the upward/downward direction. Accordingly, it is possible to adjust the tilt in the upward/downward direction of the aiming bracket 51 that holds the light source unit.

Further, in the optical axis adjustment mechanism 50 of the embodiment, while the configuration of supporting the aiming bracket 51 that holds the light source unit in a tiltable manner is provided, for example, in the light source unit including the light source and the reflector configured to reflect light emitted from the light source and configured to radiate the light reflected by the reflector to the front of the vehicle, the optical axis of the light radiated from the light source unit toward the front of the vehicle may be adjusted by supporting the aiming bracket 51 attached to the back side of the reflector via the fixed support part 52, the first aiming part 53 and the second aiming part 54 in a tiltable manner.

In addition, in the vehicle lamp 1 including the optical axis adjustment mechanism 50, after detecting the tilt of the vehicle in the forward/rearward direction, a leveling operation is performed to automatically adjust the optical axis of the light radiated from the lighting fixture unit toward the front of the vehicle in the upward/downward direction, making it possible to correct fluctuations in the optical axis caused by changes in the vehicle's attitude.

Specifically, the optical axis adjustment mechanism 50 includes the leveling actuator 5 of the embodiment. The leveling actuator 5 of the embodiment is located in the second aiming part 54 and is slidably attached to the housing 2 in the forward/rearward direction to slide the third support point S3 of the aiming bracket 51 in the forward/rearward direction.

In addition, the leveling actuator 5 of the embodiment has a tip side of the leveling shaft 14 connected to the reflector via a pivot portion 7 provided on the back side of the aiming bracket 51. Accordingly, the aiming bracket 51 is supported via the pivot portion 7 in a tiltable manner.

In the leveling actuator 5 of the embodiment, by sliding the leveling shaft 14 in the forward/rearward direction, it is possible to automatically adjust the optical axis of the light radiated from the lighting fixture unit toward the front of the vehicle in the upward/downward direction while changing the tilt of the aiming bracket 51 in the upward/downward direction.

Here, a specific configuration of the leveling actuator 5 of the embodiment will be described with reference to FIG. 3 to FIG. 9.

As shown in FIG. 3 to FIG. 7, the leveling actuator 5 of the embodiment has a structure in which the respective parts of the leveling shaft 14, the rotation support body 15, a rotary motor 16, a drive transmission part 17, and a circuit board 18 are accommodated inside a case body 13 constituted by a case 11 with an opening on the back side and the cover 12 configured to cover the back side of the case 11.

The case 11 and the cover 12 that constitute the case body 13 are both made of resin molded bodies formed of synthetic resin using a mold. The case 11 is formed in a substantially rectangular box shape, having a front wall surface 11a, an outer circumferential wall 11b rising rearward from a periphery of the front wall surface 11a, and an opening portion 11c that opens on the back side of the outer circumferential wall 11b. Meanwhile, the cover 12 is formed in a substantially rectangular box shape, having a back surface wall 12a, an outer circumferential wall 12b rising forward from a periphery of the back surface wall 12*a*, and an opening portion 12*c* that opens on the front side of the outer circumferential wall 12*b*.

The case body 13 configures an accommodating space configured to accommodate the above-mentioned components inside by butting the outer circumferential wall 11*b* of the case 11 and the outer circumferential wall 12*b* of the cover 12 against each other and closing the opening portion 11*c* of the case 11 with the cover 12.

In addition, the structure for attaching the cover 12 to the case 11 is not particularly limited and may be, for example, screw fastening or hook fastening. In the embodiment, the cover 12 is attached to the case 11 by engaging locking claws 19*c* provided at tips of a plurality of hook pieces 19*b* protruding forward from the outer circumferential wall 12*b* of the cover 12 with respect to a plurality of locking holes 19*a* that are provided in the outer circumferential wall 11*b* of the housing 2.

The case 11 has a front sleeve portion 20 that protrudes cylindrically forward and rearward from an upper portion of the front side and an upper portion of the back side of the front wall surface 11*a*, a circular hole portion 21 that penetrates the front side of the front sleeve portion 20, and a circular ring-shaped front sliding surface 22 formed by a rear tip surface of the front sleeve portion 20.

As shown in FIG. 3 to FIG. 7 and the portion (A) and the portion (B) of FIG. 8, the cover 12 has a rear sleeve portion 23 protruding forward from the upper portion of the front side of the back surface wall 12*a*, a circular ring-shaped rear sliding surface 24 formed by a front tip surface of the rear sleeve portion 23, and a guide slit 25 formed by cutting out a part of the rear sleeve portion 23 in the axial direction.

As shown in FIG. 3 to FIG. 7, the leveling shaft 14 is made of a resin molded body formed of synthetic resin that has excellent abrasion resistance, and is formed into a long shaft shape as a whole. The leveling shaft 14 has a spherical pivot ball 26 on a tip side thereof, a male thread portion 27 on an outer circumferential portion thereof, the wheel portion 28 protruding from an outer circumferential portion on a rear end side thereof in a circular ring shape, and a guide protrusion 29 protruding from an outer circumferential portion of the wheel portion 28.

The leveling shaft 14 has a tip side protruding forward from the hole portion 21 of the case 11, and is supported to be slidable in the axial direction (forward/rearward direction) with the wheel portion 28 fitted inside the rear sleeve portion 23.

In addition, in the leveling actuator 5 of the embodiment, a guide mechanism guides the guide protrusion 29 engaged with the guide slit 25 so that the guide protrusion 29 can slide in the axial direction. Accordingly, the rotation of the leveling shaft 14 (so-called co-rotation) that accompanies the rotation of the rotation support body 15 (described later) about its axis is regulated.

The tip side of the leveling shaft 14 is attached to a mount ring 6 via the pivot portion 7. The pivot portion 7 connects the tip side of the leveling shaft 14 to the mount ring 6 by fitting the pivot ball 26 of the leveling shaft 14 into a pivot bearing (not illustrated) provided in the mount ring 6.

The rotation support body 15 is a resin molded body made of synthetic resin with excellent abrasion resistance, and is formed into an approximately cylindrical shape as a whole. The rotation support body 15 has the cylindrical rotating cylinder 30 through which the leveling shaft 14 passes in the axial direction, a female thread portion 31 that threadably engages with the male thread portion 27 at an inner circumferential portion of the rotating cylinder 30, and a ring gear

32 that protrudes in a ring shape from an outer circumferential portion of the rotating cylinder 30.

The rotation support body 15 is rotatably supported around the axis of the leveling shaft 14, with the front side of the rotating cylinder 30, which sandwiches the ring gear 32, fitted inside the front sleeve portion 20, and the rear side of the rotating cylinder 30, which sandwiches the ring gear 32, fitted inside the rear sleeve portion 23.

In addition, the rotation support body 15 is rotatably supported around the axis of the leveling shaft 14, with the ring gear 32 sandwiched in the axial direction between the front sliding surface 22 provided at the tip (rear end) of the front sleeve portion 20 and the rear sliding surface 24 provided at the tip (front end) of the rear sleeve portion 23.

As shown in FIG. 3 to FIG. 7, the rotary motor 16 has a rotary shaft 16*a* and a drive gear 33 provided on the tip of the rotary shaft 16*a*, and drives the rotary shaft 16*a* to rotate.

The drive transmission part 17 has shift gears 34 and 35 that are meshed between the ring gear 32 of the rotation support body 15 and the drive gear 33 of the rotary motor 16. Specifically, the drive transmission part 17 has a first shift gear 34 that meshes with the ring gear 32 and a second shift gear 35 that meshes with the drive gear 33, with the shift gears 34 and 35 arranged coaxially and integrated. Among these, the ring gear 32, which serves as a worm wheel, and the first shift gear, which serves as a worm, are meshed with each other to constitute a worm gear, and the drive gear 33, which serves as a worm, and the second shift gear, which serves as a worm wheel, are meshed with each other to constitute a worm gear.

In the leveling actuator 5 of this embodiment, the driving force of the rotary motor 16 can be transmitted to the rotation support body 15 via the drive transmission part 17.

Further, the drive transmission part 17 is not necessarily limited to this configuration, and the number and arrangement of shift gears can be changed. In addition, the drive transmission part 17 may be omitted, and the driving force of the rotary motor 16 may be transmitted directly to the rotation support body 15 by meshing between the drive gear 33 of the rotary motor 16 and the ring gear 32 of the rotation support body 15.

The circuit board 18 is electrically connected to the rotary motor 16. In addition, the circuit board 18 has a connector portion 36. The connector portion 36 is provided on the circuit board 18 while being exposed to the outside through a window portion 12*d* provided in the outer circumferential wall 12*b* of the cover 12.

Accordingly, in the leveling actuator 5 of the embodiment, it is possible to supply electric power to the rotary motor 16 and control the drive of the rotary motor 16 via a harness connected to the connector portion 36.

In the leveling actuator 5 of the embodiment having the above-mentioned configuration, the driving force of the rotary motor 16 is transmitted to the rotation support body 15 via the drive transmission part 17, causing the rotation support body 15 to rotate around the axis of the leveling shaft 14. In addition, when the rotation support body 15 is rotated, the leveling shaft 14 slides in the axial direction due to the threaded engagement between the male thread portion 27 and the female thread portion 31. In addition, depending on the rotation direction of the rotary motor 16, the leveling shaft 14 can be advanced or retreated.

In the leveling actuator 5 of the embodiment, the rotation support body 15 is supported so as to be freely rotatable around the axis of the leveling shaft 14, with the ring gear 32 sandwiched between the front sliding surface 22 provided on the inner side of the above mentioned case 11 and the rear sliding surface 24 provided on the inner side of the cover 12.

Accordingly, in the leveling actuator 5 of the embodiment, the rotation support body 15, which is rotatably supported around the axis of the leveling shaft 14 described above, can be supported within the case body 13 so as to be rotatable with high accuracy without causing rattling.

In addition, in the leveling actuator 5 of the embodiment, by supporting the rotation support body 15 with accuracy, it is possible to slide the leveling shaft 14 in the axial direction with accuracy.

In particular, in the leveling actuator 5 of the embodiment, as shown in FIG. 9, by making an outer diameter a of the wheel portion 28 of the leveling shaft 14 and an outer diameter b of the rotating cylinder 30 of the rotation support body 15 have the same dimensions, it is possible to improve the shaft rotation accuracy of the rotation support body 15 between the front sleeve portion 20 and the rear sleeve portion 23.

Accordingly, in the vehicle lamp 1 including the leveling actuator 5 of the above-mentioned embodiment, it is possible to accurately adjust the optical axis using the optical axis adjustment mechanism 50 described above.

In addition, in the leveling actuator 5 of the embodiment, there is no need to adopt a hook fastening structure as in the related art, and the mold structure does not become complicated when molding the case 11 and the cover 12. Accordingly, it also becomes easy to control the dimension between the front sliding surface 22 and the rear sliding surface 24 which sandwich the ring gear 32.

Incidentally, in the vehicle lamp 1 of the embodiment, as shown in FIG. 2, the leveling actuator 5 is attached to the housing 2 so as to be slidable in the forward/rearward direction, and the leveling actuator 5 can be slid in the forward/rearward direction by rotating the adjuster 54a of the second aiming part 54.

Specifically, as shown in FIG. 10, FIG. 11 and FIG. 12, the front side of the housing 2 is provided with the accommodating recess portion 40 which accommodates the case body 13 of the leveling actuator 5 so that it can slide freely in the forward/rearward directions.

The accommodating recess portion 40 is provided inside a wall portion 40a, which surrounds the case body 13 on all four sides and protrudes forward from the front side of the housing 2. In addition, the inner surface of the accommodating recess portion 40 is provided with a plurality of guide recess portions 41 that guide the case body 13 in the forward/rearward directions.

The plurality of guide recess portions 41 are constituted by groove portions formed by cutting out the inner surface of the wall portion 40a in the forward/rearward direction. Further, the number and arrangement of the guide recess portions 41 are not particularly limited and can be adjusted as appropriate. For example, in the embodiment, on the inner surface of the wall portion 40a, the guide recess portions 41 are provided, two on each of the upper surface and both side surfaces, and one on the lower surface.

Meanwhile, the periphery of the case body 13 is provided with a plurality of guide protrude portions 42 which are guided in the forward/rearward directions of the accommodating recess portion 40 while engaged with the plurality of guide recess portions 41. The plurality of guide protrude portions 42 extend in the forward/rearward directions of the case body 13 and are constituted by rib walls protruding in an approximately arc-shaped manner from positions facing each of the plurality of guide recess portions 41.

Accordingly, the leveling actuator 5 of the embodiment is attached so as to be slidable in the forward/rearward directions of the housing 2 with the case body 13 accommodated inside the accommodating recess portion 40, and with the guide recess portions 41 and the guide protrude portions 42 in sliding contact with each other, in a state in which the plurality of guide protrude portions 42 are engaged with the plurality of guide recess portions 41.

Incidentally, the inner surface of the accommodating recess portion 40 has a die draft that is used when molding the housing 2 from resin. That is, the inner surface of the wall portion 40a is inclined so as to gradually widen toward the front.

On the other hand, the plurality of guide recess portions 41 are formed so that their depth gradually decreases forward relative to the inclined inner surface of the wall portion 40a in order to be parallel to one another in the forward/rearward direction of the accommodating recess portion 40.

Accordingly, in the leveling actuator 5 of the embodiment, while maintaining a constant sliding resistance between the guide recess portions 41 and the guide protrude portions 42 that are in sliding contact with each other, the case body 13 accommodated inside the accommodating recess portion 40 can be slid in the forward/rearward direction with high accuracy.

In addition, as shown in FIG. 4 to FIG. 7, in addition to the above-mentioned configuration, the leveling actuator of the embodiment is characterized in that it is equipped with an aiming nut 43, and an aiming bolt 44 screwed into the aiming nut 43 is located on the same axis as the leveling shaft 14.

Specifically, the cover 12 has a rectangular hole portion 12e penetrating the back surface wall 12a. The hole portion 12e penetrates the inside of the rear sleeve portion 23 to allow the tip side of the aiming bolt 44 to pass therethrough.

The aiming nut 43 is constituted by a resin molded body and has a female thread portion 43a at an inner circumferential portion thereof, a stopper 43b at an outer circumferential portion thereof, and a flange portion 43c protruding in an expansion direction from the outer circumferential portion on the rear end side.

The aiming nut 43 is attached to the cover 12 with the stopper 43b engaged around the hole portion 12e in a state in which the aiming nut 43 is inserted into the inside of the cover 12 through the hole portion 12e and the flange portion 43c abutting against the back side of the cover 12.

Accordingly, the aiming nut 43 is provided on the back side of the cover 12 facing the hole portion 12e. Further, the aiming nut 43 is not limited to being provided separately from the cover 12 as described above, but may be provided integrally with the cover 12 on the back side of the cover 12 facing the hole portion 12e.

The aiming bolt 44 is formed in a long axis shape as a whole, and has a male thread portion 44a at an outer circumferential portion thereof, and a wheel portion 44b protruding in a circular ring shape from the outer circumferential portion of a rear end side thereof.

The aiming bolt 44 is available in either metal or resin, and the aiming nut 43 for either metal or resin can be interchangeably attached to the cover 12 to suit the difference in material. Accordingly, it is possible to standardize the portions other than the aiming nut 43 for metal or resin.

The aiming bolt 44 is attached so as to be freely rotatable relative to the housing 2, with the housing 2 sandwiched between the attachment ring 45 and the wheel portion 44b, in a state in which the aiming bolt 44 passes through a shaft hole (not shown) that penetrates the accommodating recess portion 40 of the housing 2 and an attachment ring 45 provided inside the accommodating recess portion 40 from the back side of the housing 2.

In addition, the aiming bolt 44 is located on the same axis as the leveling shaft 14, and the male thread portion 44*a* is screwed into the female thread portion 43*a* of the aiming nut 43. Correspondingly, a shaft hole 14*a* is provided on the rear end side of the leveling shaft 14, into which the tip side of the aiming bolt 44 is inserted in a non-contact state. That is, the rear end side of the leveling shaft 14 is provided with the shaft hole 14*a* whose diameter is larger than that of the tip side of the aiming bolt 44.

In the optical axis adjustment mechanism 50, the adjuster 54*a* of the second aiming part 54 described above can be rotated in conjunction with the rotational operation to rotate the aiming bolt 44 around an axis thereof.

In the leveling actuator 5 of the embodiment, when the aiming bolt 44 is rotated, the threaded engagement between the male thread portion 44*a* and the female thread portion 43*a* causes the aiming bolt 44, together with the case body 13, to slide in the forward/rearward direction of the accommodating recess portion 40.

In addition, as shown in the portion (A) and the portion (B) of FIG. 13, the leveling actuator 5 (the case body 13) may be advanced depending on the rotation direction of the aiming bolt 44, or as shown in the portion (A) and the portion (B) of FIG. 14, the leveling actuator 5 (the case body 13) may be moved rearward.

Accordingly, in the optical axis adjustment mechanism 50, by rotating the adjuster 54*a* of the second aiming part 54 described above, it is possible to slide the leveling actuator 5 (the case body 13) in the forward/rearward direction relative to the accommodating recess portion 40 of the housing 2.

In the vehicle lamp 1 including the leveling actuator 5 of the embodiment having the above-mentioned configuration, there is no need to provide the bracket that holds the leveling actuator 5 between the housing 2 and the bracket. Accordingly, it is possible to achieve space saving within the lighting body 4 and to achieve weight reduction of the vehicle lamp 1 by reducing the number of parts.

In addition, in the leveling actuator 5 of the embodiment, the aiming bolt 44 described above is positioned on the same axis as the leveling shaft 14, and the tip side of the aiming bolt 44 can be inserted into the inside of the shaft hole 14*a* from the rear end side of the leveling shaft 14. Accordingly, it is possible to reduce the space in the forward/rearward direction of the leveling actuator 5, which is slid in the forward/rearward direction inside the accommodating recess portion 40, while preventing interference between the aiming bolt 44 and the leveling shaft 14.

Further, the tip side of the leveling shaft 14 does not necessarily have to be always inserted inside the shaft hole 14*a*, but may be positioned outside the shaft hole 14*a* when the leveling shaft 14 is advanced.

In addition, in the vehicle lamp 1 of the embodiment, while having a simple structure in which the guide recess portions 41 and the guide protrude portions 42 described above are in sliding contact with each other, it is possible to slide the leveling actuator 5 accommodated inside the accommodating recess portion 40 in the forward/rearward direction with high accuracy.

In this way, the vehicle lamp 1 equipped with the leveling actuator 5 of the embodiment can achieve space saving within the lighting body 4 while having a simple structure.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A leveling actuator configured to adjust an optical axis of light radiated from a lighting fixture unit of a vehicle lamp, in which the lighting fixture unit is disposed inside a lighting body, in front of a vehicle, the leveling actuator comprising:

a leveling shaft slidably driven in an axial direction in a state in which a tip side is connected to the lighting fixture unit via a pivot portion;

a case configured to accommodate the leveling shaft therein from an opening portion on a back side and configured to cause the tip side of the leveling shaft to protrude forward from a hole portion on a front side;

a cover configured to close the opening portion of the case and having a hole portion on a back side; and an aiming nut provided to face the hole portion on the back side of the cover, wherein an aiming bolt inserted into the cover from the hole portion is located on a same axis as the leveling shaft while being screwed into the aiming nut.

2. The leveling actuator according to claim 1, wherein a shaft hole into which a tip side of the aiming bolt is inserted in a non-contact state is provided on a rear end side of the leveling shaft.

3. The leveling actuator according to claim 1, wherein the aiming bolt is rotatably attached to a housing that constitutes the back side of the lighting body, and a case body constituted by the case and the cover is slid in a forward/rearward direction by a rotate operation of the aiming bolt.

4. The leveling actuator according to claim 3, wherein the housing has an accommodating recess portion configured to accommodate the case body to be slidable in the forward/rearward direction, and a plurality of guide protrude portions are provided around the case body to be in sliding contact with an inner surface of the accommodating recess portion.

5. The leveling actuator according to claim 1, further comprising a rotary motor and a drive transmission part accommodated inside the case, wherein rotation driving of the rotary motor is converted into slide driving of the leveling shaft and is transmitted via the drive transmission part.

6. A vehicle lamp comprising the leveling actuator according to claim 1.

* * * * *